United States Patent
Zhu

(10) Patent No.: US 10,882,534 B2
(45) Date of Patent: Jan. 5, 2021

(54) PREDETERMINED CALIBRATION TABLE-BASED VEHICLE THROTTLE/BRAKE ASSIST SYSTEM FOR L2 AUTONOMOUS DRIVING

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 211 days.

(21) Appl. No.: 16/205,193

(22) Filed: Nov. 29, 2018

(65) Prior Publication Data

US 2020/0172117 A1 Jun. 4, 2020

(51) Int. Cl.
*B60W 50/00* (2006.01)
*G05D 1/00* (2006.01)
*B60W 40/02* (2006.01)

(52) U.S. Cl.
CPC ............ *B60W 50/00* (2013.01); *B60W 40/02* (2013.01); *G05D 1/0088* (2013.01); *B60W 2050/0083* (2013.01); *B60W 2520/10* (2013.01); *B60W 2530/20* (2013.01); *B60W 2552/00* (2020.02); *B60W 2552/15* (2020.02); *B60W 2552/40* (2020.02); *B60W 2555/20* (2020.02); *B60W 2720/106* (2013.01); *B60W 2900/00* (2013.01)

(58) Field of Classification Search
CPC .. B60W 50/00; B60W 40/02; B60W 2550/14; B60W 2550/142; B60W 2720/106; B60W 2530/20; G05D 1/00
See application file for complete search history.

(56) References Cited

U.S. PATENT DOCUMENTS

| | | | |
|---|---|---|---|
| 9,517,703 B1* | 12/2016 | Liu .................... | B60H 1/00392 |
| 2013/0296132 A1* | 11/2013 | Doering ................ | B60W 10/08 477/86 |
| 2015/0005982 A1* | 1/2015 | Muthukumar .......... | G01P 15/00 701/1 |
| 2015/0232092 A1 | 8/2015 | Fairgrieve et al. | |
| 2016/0229397 A1* | 8/2016 | Muthukumar ........ | B60W 10/20 |
| 2017/0001645 A1* | 1/2017 | Fairgrieve .............. | B60K 28/16 |
| 2017/0058808 A1 | 3/2017 | Gennard et al. | |

FOREIGN PATENT DOCUMENTS

DE 102009006748 8/2010

* cited by examiner

*Primary Examiner* — Tan Q Nguyen
(74) *Attorney, Agent, or Firm* — Womble Bond Dickinson (US) LLP

(57) ABSTRACT

In one embodiment, in response to a first control command originated from a driver of an ADV, an expected acceleration of the ADV in response to the first control command is determined in view of a current speed of the ADV under the standard driving environment (e.g., dry road, flat road surface, normal tire pressure, zero load). One of the command calibration tables is selected based on a current driving environment of the ADV at the point in time. A lookup operation is performed in the selected command calibration table to obtain a second control command based on the current speed and expected acceleration of the ADV. The second control command is then issued to the ADV to control the ADV. As a result, the ADV would have reached the same acceleration under the current driving environment as if the ADV was driving in the standard driving environment.

20 Claims, 12 Drawing Sheets

| Driving Environment ID | Weather Condition (e.g., dry/wet) | Road Surface Condition (e.g., flat/rough) | Tire Pressure Condition (e.g., high/normal/low) | Load Condition (e.g., 0, 10, 20,...kg) |
|---|---|---|---|---|
| Driving Environment #1 | dry | flat | normal | 10 kg |
| Driving Environment #2 | wet | rough | high | 50 kg |
| ... | ... | ... | ... | ... |
| | 501 | 502 | 503 | 504 |

400

| Driving Environment ID | Weather Condition (e.g., dry/wet) | Road Surface Condition (e.g., flat/rough) | Tire Pressure Condition (e.g., high/normal/low) | Load Condition (e.g., 0, 10, 20,...kg) |
|---|---|---|---|---|
| Driving Environment #1 | dry | flat | normal | 10 kg |
| Driving Environment #2 | wet | rough | high | 50 kg |
| ⋮ | ⋮ 501 | ⋮ 502 | ⋮ 503 | ⋮ 504 |

PREDETERMINED CALIBRATION TABLE-BASED VEHICLE THROTTLE/BRAKE ASSIST SYSTEM FOR L2 AUTONOMOUS DRIVING

TECHNICAL FIELD

Embodiments of the present disclosure relate generally to operating autonomous vehicles. More particularly, embodiments of the disclosure relate to L2 autonomous driving using predetermined command calibration tables.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional motion planning operations estimate the difficulty of completing a given path mainly from its curvature and speed, without considering the differences in features for different types of vehicles. Same motion planning and control is applied to all types of vehicles and treats all road conditions the same, which may not be accurate and smooth under some circumstances.

Autonomous driving can be defined in several levels, from level 0 (L0) to level 5 (L5). In level 2 or L2, at least one driver assistance system of both steering and acceleration/deceleration using information about the driving environment is automated, like cruise control and lane-centering. It means that the driver is disengaged from physically operating the vehicle by having his or her hands off the steering wheel and foot off pedal at the same time. The driver must still always be ready to take control of the vehicle, however. When a human driver presses on the gas pedal or turns a steering wheel, the driver expects the vehicle to respond according to an expectation of the driver. However, in certain driving circumstances (e.g., bad weather condition, rough road), the vehicle may not respond to meet the expectation. There has been a lack of efficient ways to compensate these situations.

BRIEF DESCRIPTION OF THE DRAWINGS

Embodiments of the disclosure are illustrated by way of example and not limitation in the figures of the accompanying drawings in which like references indicate similar elements.

FIG. 5A is a block diagram illustrating a set of driving environment categories according to one embodiment.

DETAILED DESCRIPTION

Figure 1:
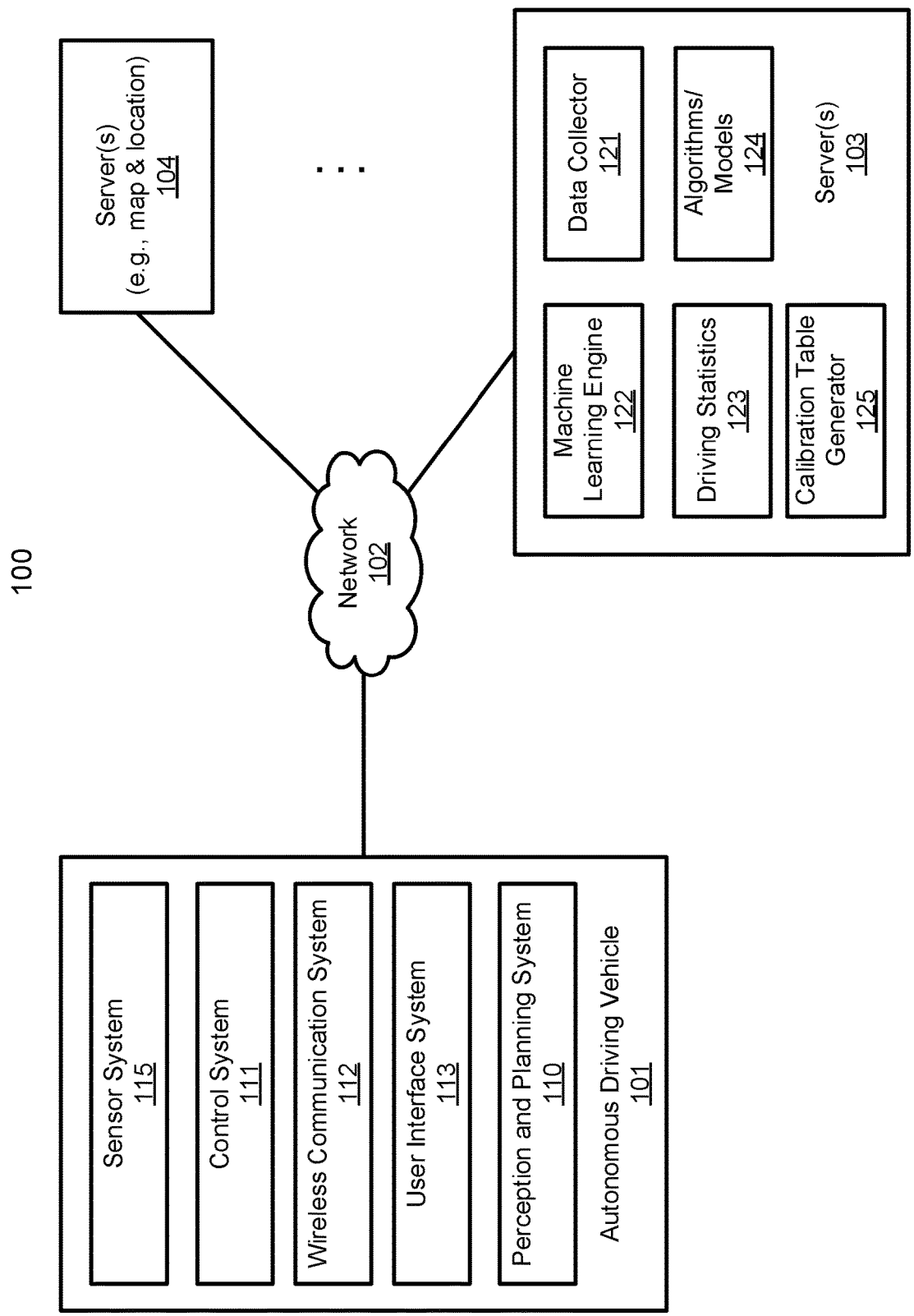
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a set of predetermined calibration tables is utilized to help adjust or calibrate the control commands for different specific driving environments. The calibration tables may be created offline based on the driving statistics collected from various vehicles driving under different driving environments, such as, for example, different vehicle loads, weather conditions, and road surface conditions, etc. For each of the predetermined driving environment categories, at least one command calibration table is created. This process can be performed offline at a server to collect data from a variety of vehicles driven in a variety of driving environments. The calibration tables can then be uploaded to an autonomous driving vehicle (ADV) to be utilized at real-time to determine a proper control command in response to an expected vehicle state (e.g., acceleration, steering angle).

At real-time, after an autonomous driving vehicle (ADV) has been driving for a while and a set of driving statistics has been collected, one of the command calibration tables is selected by matching the driving environment derived from the driving statistics and the predetermined driving environment categories corresponding to the command calibration tables. The selected command calibration table can then be utilized in subsequent driving cycles to generate control commands to drive the ADV through lookup operations, without having to calculating the commands at real-time.

For each of the control commands (e.g., throttle, brake, steering commands) received from a driver, a standard calibration table is utilized to determine an expected result of the vehicle (e.g., acceleration, steering angle changes) in response to the control command. The standard calibration table represents an ideal driving environment such as a dry road, flat road surface, normal tire pressure, and empty load. Based on the expected result, another lookup operation is performed on the selected calibration table to locate an entry matching the expected result. A second control command is obtained from the matching entry. The second control command is then sent to the vehicle to control the vehicle, such that the driver would experience the same result in the current driving environment as of driving in the standard driving environment.

According to one embodiment, in response to a first control command originated from a driver of an ADV, an expected acceleration of the ADV in response to the first control command is determined in view of a current speed of the ADV under the standard driving environment (e.g., dry road, flat road surface, normal tire pressure, zero load). One of the command calibration tables is selected based on a current driving environment of the ADV at the point in time. A lookup operation is performed in the selected command calibration table to obtain a second control command based on the current speed and expected acceleration of the ADV. The second control command is then issued to the ADV to control the ADV. As a result, the ADV would have reached the same acceleration under the current driving environment as if the ADV was driving in the standard driving environment.

In one embodiment, each of the command calibration tables is associated with a specific driving environment or driving condition, such as a weather condition (e.g., dry or wet), a road surface condition (e.g., flat or rough), and a load condition of the vehicle (which may be represented by tire pressure). That is, each of the command calibration tables corresponds to a unique combination of the weather condition, road surface condition, and load condition. For example, a first driving condition may include a dry road, flat road surface, and no load condition (e.g., only one human driver, no other load), and a second driving condition can be a wet road, flat road surface, and 50 kilogram (kg) load condition, etc. Each command calibration table is created based on driving statistics collected from one or more vehicles driving in a specific driving environment associated with the command calibration table. That includes capturing different control commands issued and measuring the feedback or response from the vehicles, such as speed and acceleration at different points in time.

In one embodiment, the selected command calibration is periodically selected from the pool of command calibration tables based on the driving condition at the point in time dynamically. If the driving condition changes, a different command calibration table may be selected to be used to determine the subsequent control commands. In selecting a command calibration table from the pool, according to one embodiment, a first set of driving statistics is collected from the ADV for a period of time while the ADV is driving in a particular driving environment. A set of command calibration table candidates is identified from the pool of command calibration tables that are associated with the current driving environment. The first set of driving statistics (e.g., speed, control command, acceleration) is compared against a second set of driving statistics obtained from each of the command calibration candidates. A similarity score is calculated for each of the command calibration candidates based on the comparison. The similarity score represents a similarity between the driving statistics data collected in real-time and the ones previously determined and stored in the calibration table. One of the command calibration table candidates having the highest similarity score is then selected.

In one embodiment, the process of performing a lookup operation of a selected command calibration and the process of selecting a command calibration table may be performed using different execution threads, which may be executed by different processors or different processor cores of the same processor.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
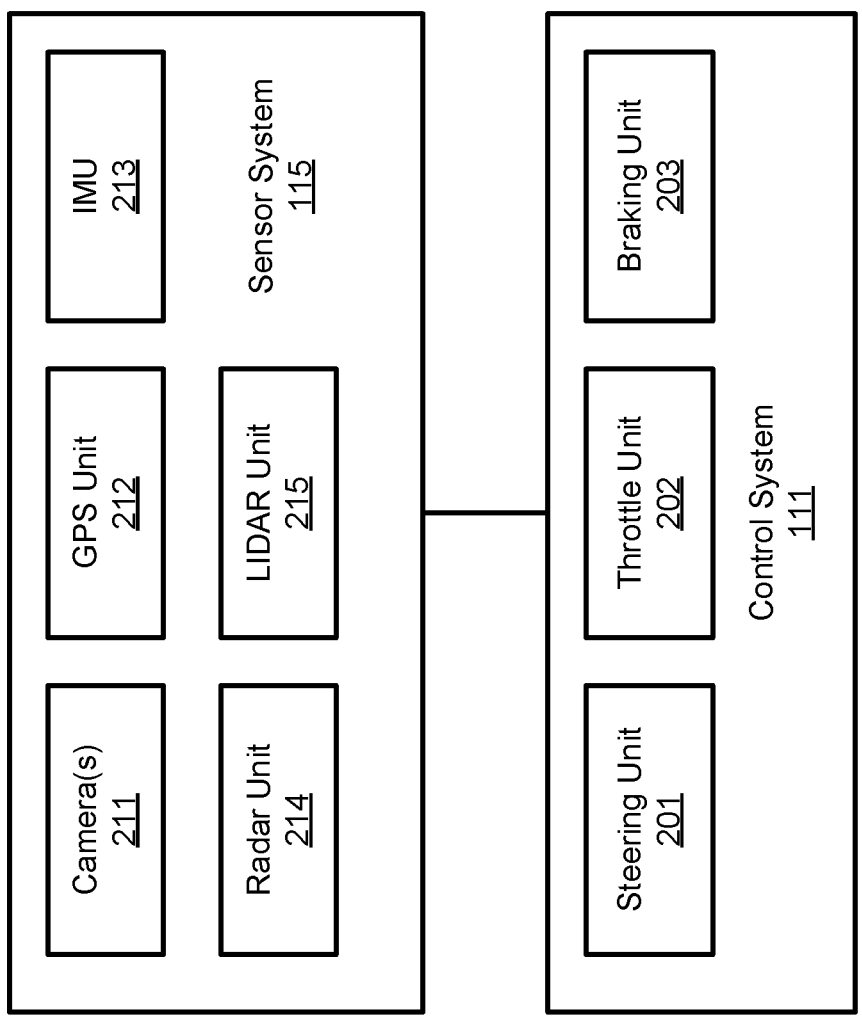
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include algorithms for perception, planning, and control processes, which will be described in details further below. Algorithms 124 can then be uploaded on ADVs to be utilized during autonomous driving in real-time.

In addition, according to one embodiment, server 103 may maintain a calibration table generator 125 configured to generate a number of calibration tables under different driving environments or driving conditions based on certain driving statistics 123 that were collected under the same or similar driving environments. For example, one or more vehicles may drive around under a particular driving environment category (e.g., dry road, rough road surface, 50 kg load). The driving statistics (e.g., speed, commands issued, and acceleration of the vehicle in response to the commands) at different points in time may be measured and collected during the driving. The driving statistics collected under the same or similar driving conditions may then be populated into a calibration table, in this example, a command calibration table, that is configured to calibrate commands under the same or similar driving environment.

There will be a number of predetermined driving environment categories, which have been predefined using certain driving parameters, such as, weather condition, road surface condition, tire pressure condition, and/or load condition. Other parameters may also be utilized to define a driving environment (also referred to as a driving condition). For each of the predetermined driving environments, at least one command calibration table is created, as shown in FIG. 4.

Figure 4:
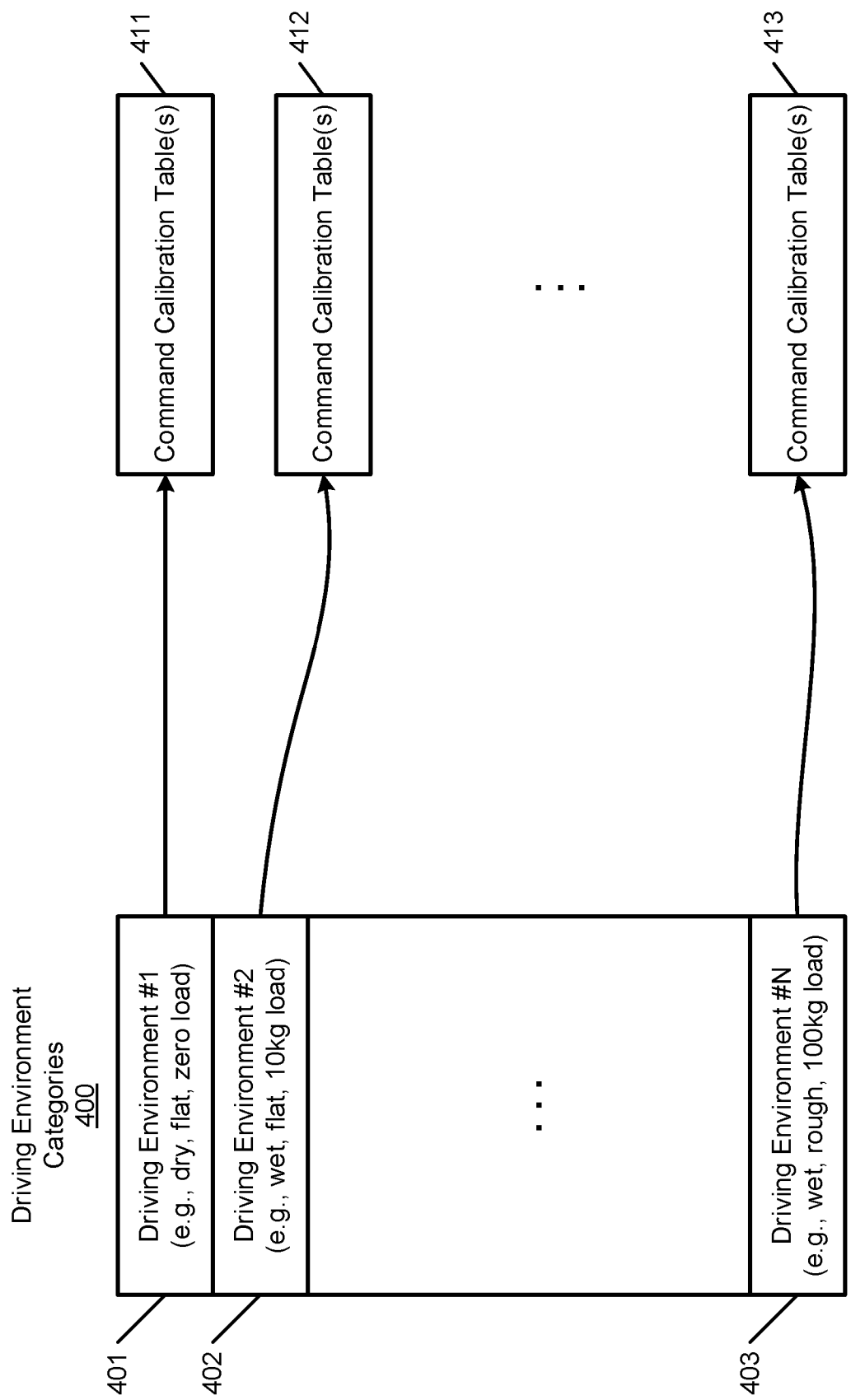
FIG. 4 is a block diagram illustrating a relationship between a driving environment and a set of one or more calibration tables according to one embodiment.

Referring to FIG. 4, for a set of predetermine driving environments 400, a command calibration table is created based on the driving statistics collected from one or more vehicles that have driven under the same or similar driving environment. In this example, driving environments 401-403 are associated with command calibration tables 411-413, respectively. Each of the predetermined driving environments 401-403 is unique compared to the rest.

In one embodiment, referring now to FIG. 5A, a driving environment is defined by at least three parameters: weather condition 501, road surface condition 502, tire pressure 503 and/or load condition 504. These are just some of the parameter examples that define the driving environments; other factors may also be utilized and considered. Weather condition 501 can include 1) dry and 2) wet road condition. Road surface condition 502 can include 1) flat surface, 2) rough surface, and 3) hybrid surface. Tire pressure condition 503 can include 1) high pressure, 2) normal pressure, and 3) low pressure. The tire pressure may directly or indirectly represent the current vehicle load. Alternatively, the tire pressure condition simply refers to the tire pressure of the tires without any load (except for the human driver). In such a configuration, the driving environment may further include a load condition parameter (e.g., 50, 100, 150 . . . 1000 kg). Alternatively, for each of the driving environments defined by weather condition, road surface condition, and tire pressure condition, there is a set of command calibration tables. Each of the calibration tables in the set is associated with a specific load.

Figure 6:
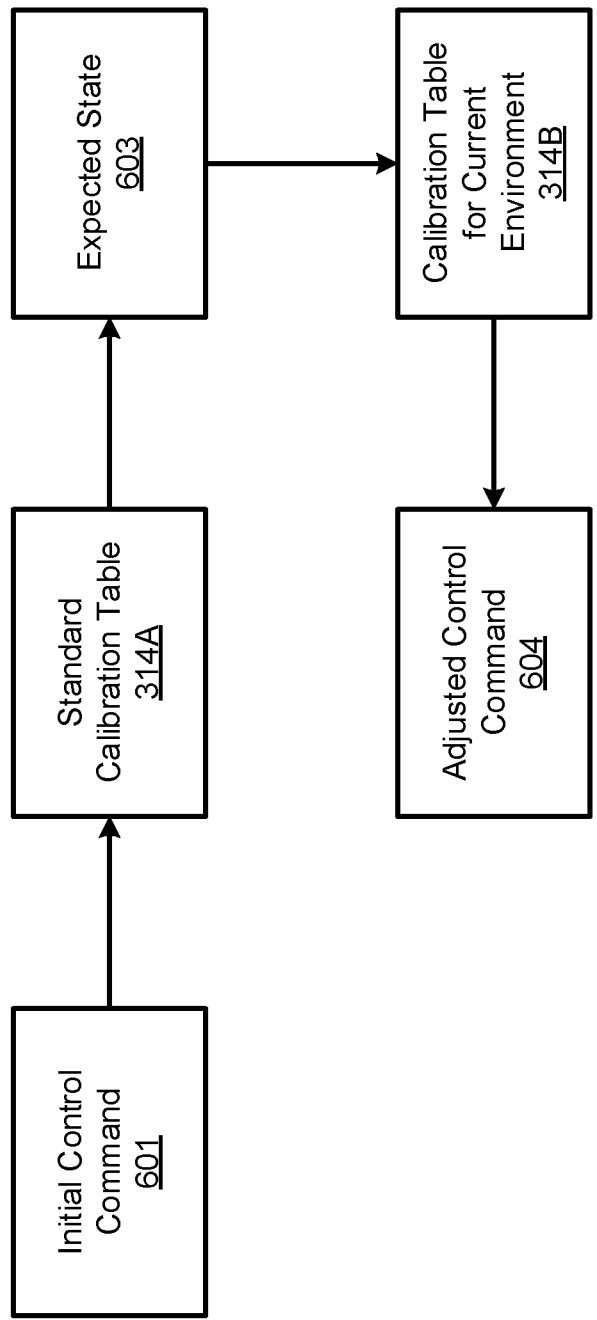
FIG. 6 is a diagram illustrating a process of determining a control command based on the driving environment according to one embodiment.

These parameters can be measured and determined using appropriate sensors such as cameras or pressure sensors, etc. Thus, there will be a number of driving environment instances represented by a unique combination of the above environment parameters. For example, a first driving environment can be a combination of dry road, flat road surface, and high tire pressure, and a second driving environment can be defined based on a combination of dry road, rough road surface, and high tire pressure, etc., optionally with a load condition. For each of the predetermined driving environments, there will be at least one command calibration table as shown in FIG. 6. One of the calibration tables is associated with a standard or ideal driving environment, such as, for example, dry road, flat road surface, normal tire pressure, and zero load. Such a calibration table is referred to as a standard calibration table.

Figure 5B:
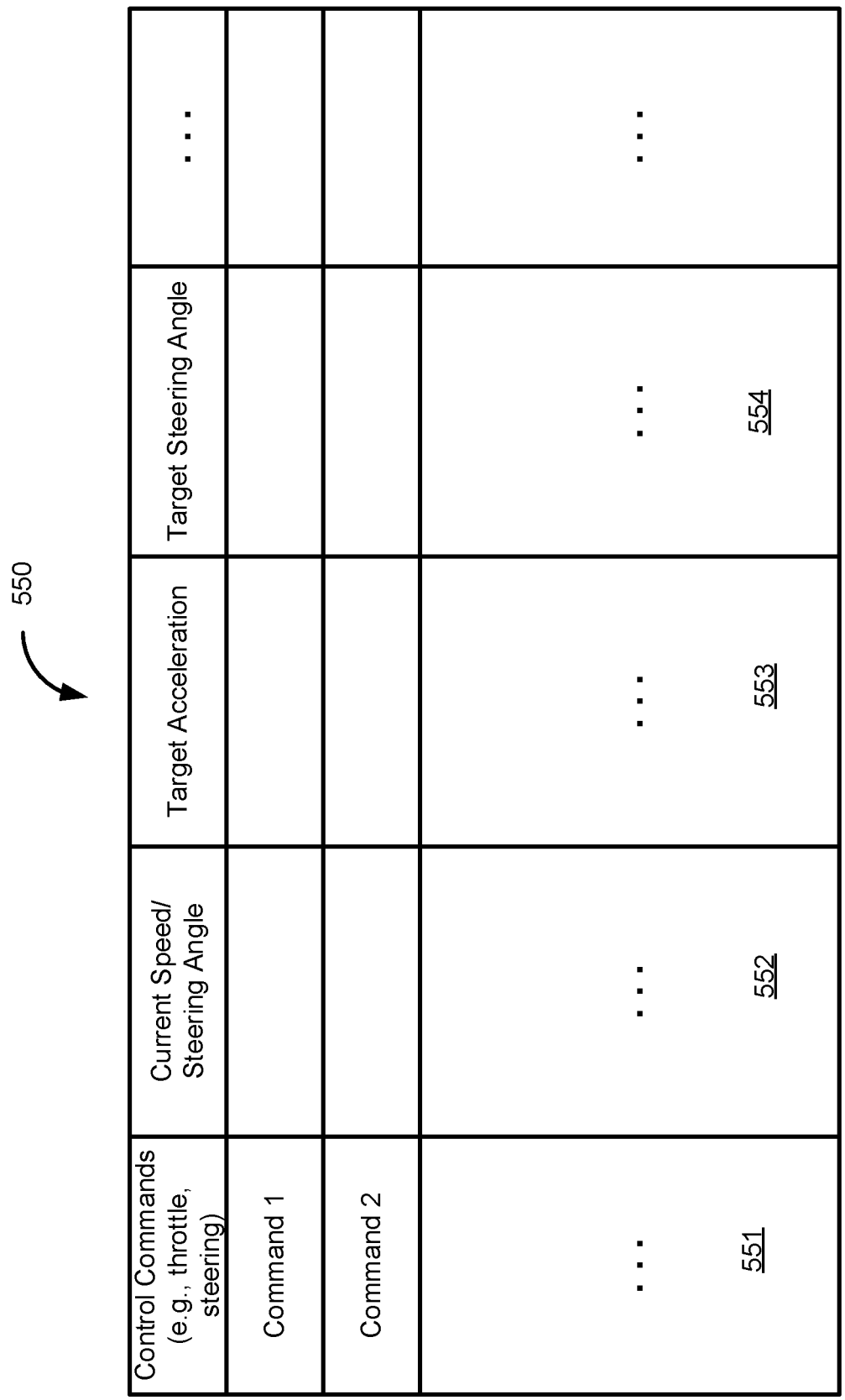
FIG. 5B is a block diagram illustrating an example of a calibration table according to one embodiment.

Referring to FIG. 5B, command calibration table 550 can represent any of the calibration tables 411-413 as shown in FIG. 4. Calibration table 550 includes a number of entries. Each entry maps a particular control command 551 and speed 552 to acceleration 553 or steering angle 554 dependent upon the type of control command 551. These data are captured and collected from one or more vehicles driving under the same or similar corresponding driving environment as described above. Control command 601 can be a throttle or brake command, which is issued at the current speed 552. A response form the vehicle can be acceleration 553, where a positive value represents acceleration and a negative value represents deceleration. Control command 551 can be a steering command, and the response of the vehicle can be steering angle 554 (from a current steering angle). Alternatively, separate calibration tables may be utilized for throttle/brake commands and steering commands. The calibration tables can then be uploaded onto autonomous driving vehicles, such as calibration tables 314 of FIGS. 3A-3B, to be utilized to calibrate the control commands at real-time during the autonomous driving.

Figure 3A:
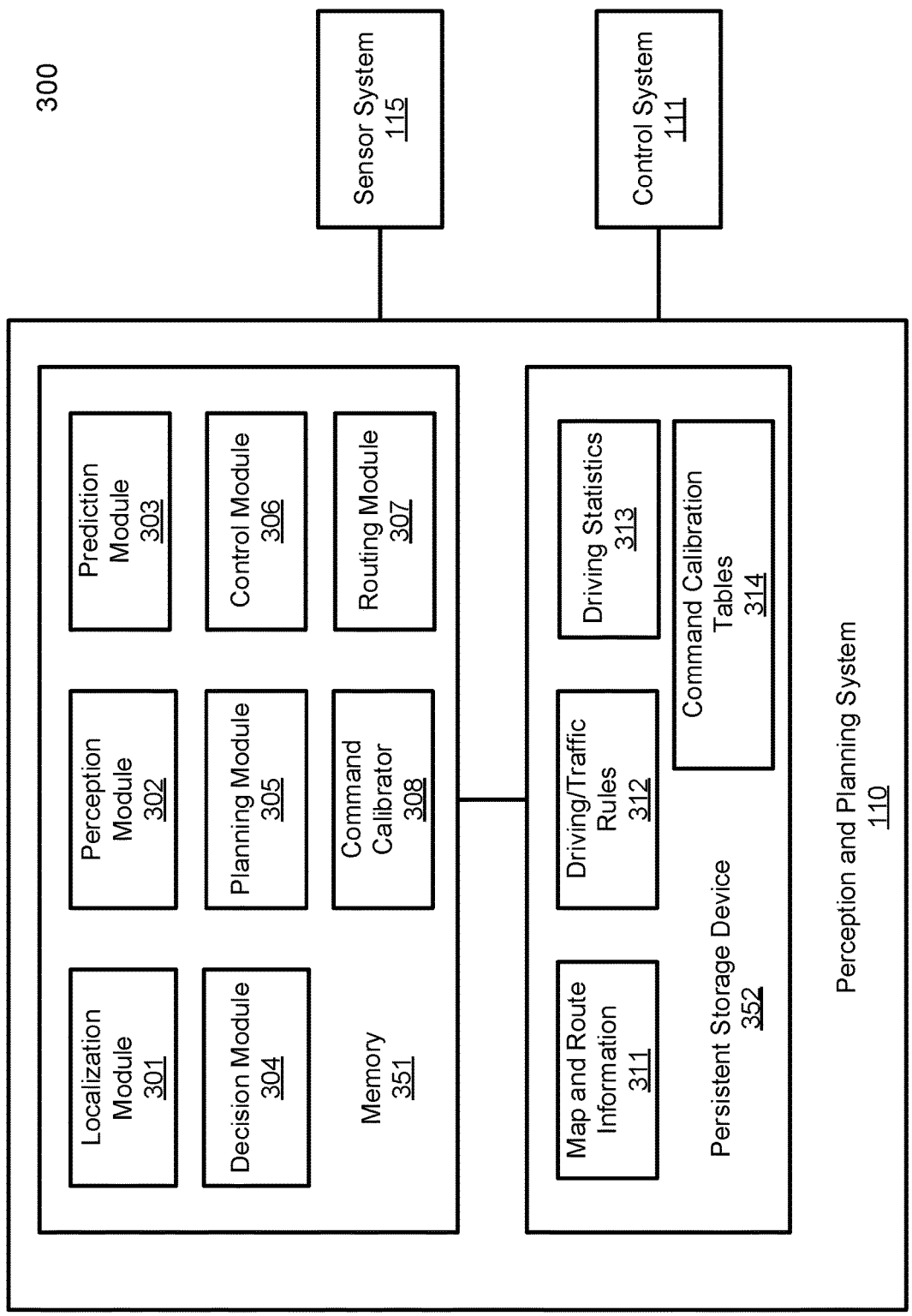
FIGS. 3A-3B are block diagrams illustrating an example of a perception and planning system used with an autonomous vehicle according to one embodiment.
Figure 3B:
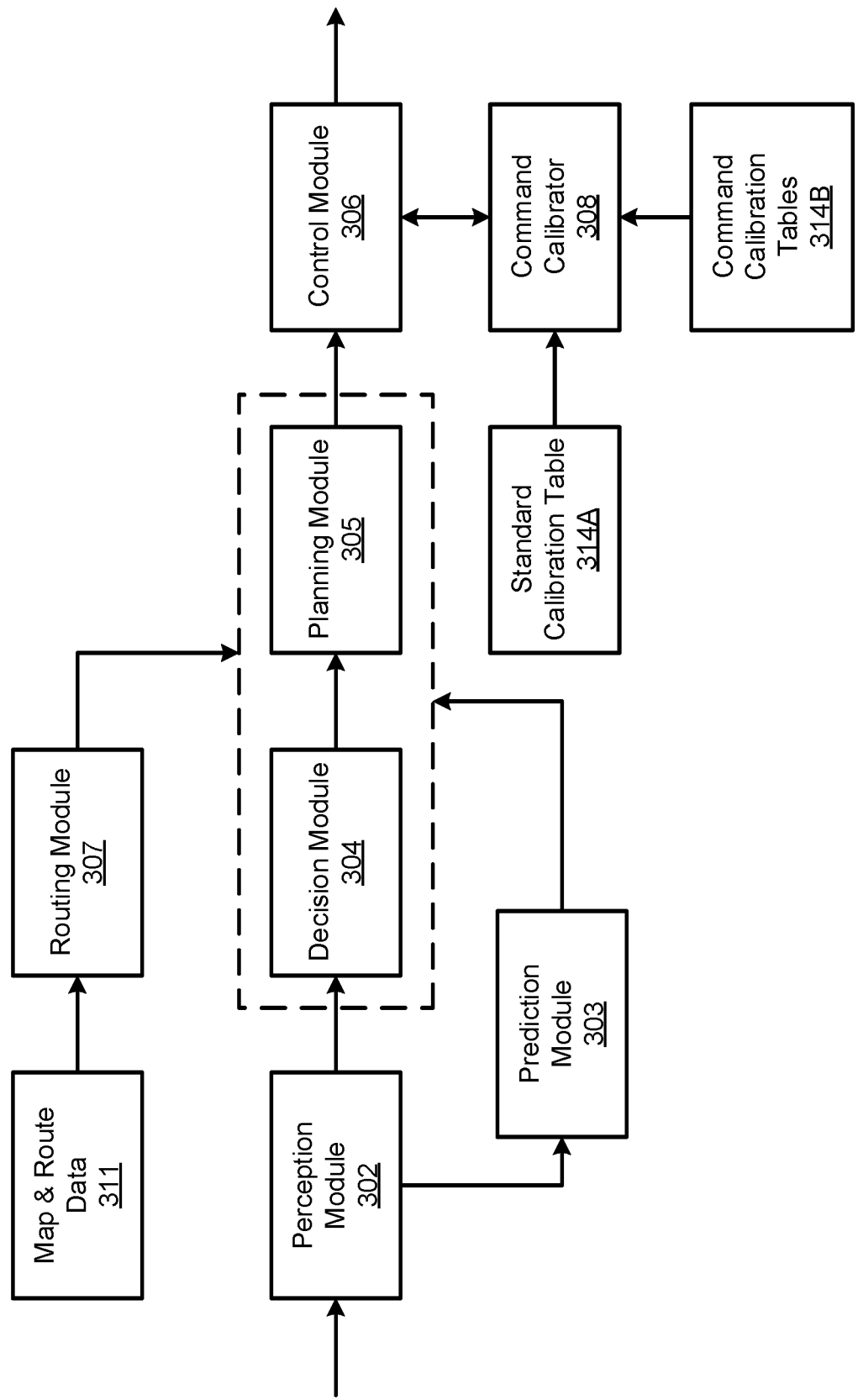

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and command calibration module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module. For example, command calibration module 308 may be integrated as a part of planning module 305 and/or control module 306.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

According to one embodiment, a data collector (not shown) is configured to collect various data from various sensors and modules and to store the data as a part of driving statistics 313, while ADV 300 is driving through the roads. As described above, the driving statistics include the speed, steering angle (e.g., heading direction), control commands issued, and the response of the vehicle at different points in time. After a predetermined period of time, the collected driving statistics 313 are utilized to match the counterpart statistics of command calibration tables 314 to select one of the calibration tables as a designated command calibration table to be utilized to calibrate the control commands subsequently.

In one embodiment, for each subset of the statistics data such as speed, command, and response of the vehicle in response to the command, a lookup operation is performed in each of the command calibration tables. A similarity score is calculated for each of the calibration tables based on the difference between the real-time collected data and the data stored in the calibration table. A calibration table with the highest similarity score is selected for subsequent command calibration.

In one embodiment, for a given command calibration table, a search is performed to locate an entry of the command calibration table that relatively matches the speed measured and command issued at real-time of a subset. The response of the vehicle measured in real-time (e.g., acceleration, steering angle) is compared with the previously captured response obtained from the matching entry to determine the difference between the subset and the matching entry. An averaged difference between the actual data of all subsets and the data stored in the calibration table is calculated for all of the subsets of statistics data. A calibration table with the lowest averaged difference, which results in the highest similarity score, will be selected.

For example, the calibration table selection process will let the vehicle to drive for a predetermined period of time such as one minute. During such a period of time, the driving statistics of the vehicle are captured and recorded as a part of driving statistics 313. In one embodiment, for each driving cycle, i.e., every 100 ms, a subset of statistics data is captured, including at least the current speed/steering angle, a control command issued, and a response of the vehicle (e.g., acceleration or steering angle) in response to the issued control command at the point in time. For the entire period of time, in this example, one minute, there will be 600 subsets of data. These subsets of data are utilized to match each of the preconfigured command calibration tables to identify one of the command calibration tables that is most similar to the subsets of statistic data captured at real-time using at least some of the techniques described above. The goal is to find a calibration table that is associated with or close to the current driving environment, such that the commands derived from the selected calibration table are most appropriate for the current driving environment.

Specifically, for a given one of the command calibration tables, each of the 600 subsets of data is utilized to compare the data stored in each of the entries of the command calibration tables, for example, by comparing the speed/ steering angle and the control command issued. The real-time captured response (e.g., acceleration, steering angle) is compared to the corresponding one from the matching entry to determine the difference. After all of the 600 subsets of statistics data have been processed against the same command calibration table, an averaged difference between the real-time measured response and the prerecorded response from matching entries is calculated for the corresponding command calibration table. A similarity score is then calculated based on the averaged difference, for example, a lower averaged difference leads to a higher similarity score.

In one embodiment, the above calibration table selection process is periodically performed to identify the best command calibration table for a driving environment determined at the point in time. As the driving environment changes, a different command calibration table may be selected.

Once the command calibration table has been selected for the specific driving environment at the point in time, the selected command calibration table can be utilized to determine the subsequent control commands (e.g., starting from the next driving cycle) via lookup operations. As a result, a proper command can be quickly determined via a lookup operation without having to calculating the specific command at the point in time, which may be resource and time consuming.

In one embodiment, referring back to FIGS. 3A-3B, 5B, and 6, when a first control command 601 is received, an expected result or response of the vehicle in view of a current state under a standard driving environment is determined. The first control command can be a throttle or brake command initiated from a human driver. Based on a current speed of the vehicle, an expected acceleration or an expected speed within a period of time can be determined under the standard driving environment. In one embodiment, the standard driving environment can be defined as driving on a dry road, on a flat road surface, with a normal tire pressure, and a zero load. The expected result can be determined based on the prior driving statistics collected from a variety of vehicles driving under a driving environment identical or similar to the defined standard driving environment.

In one embodiment, one of the command calibration tables 314 includes a standard command calibration table 314A. The standard command calibration table 314A includes a number of entries and each entry stores a subset of statistics data captured at a particular point in time. For example, a subset of statistics data may include a speed of the vehicle, a command issued, and a response of the vehicle at a particular point in time under the defined standard driving environment, for example, as shown in FIG. 5B. Similarly, the remaining command calibration tables 314B include a number of command calibration tables corresponding to different driving environments, for example, as shown in FIG. 5B.

In one embodiment, based on the first control command 601, a first lookup operation is performed in standard command calibration table 314A based on a current speed of the vehicle and the first control command to locate an entry that relatively matches the current speed of the vehicle (e.g., field 552) and the first control command (e.g., field 551). An expected result 603 can be obtained from the matching entry. For example, if the first control command is a throttle/brake command, an expected acceleration can be obtained from field 553. If the control command is a steering command, based on the current steering angle 552, an expected resulted steering angle can be obtained from field 554.

Once the expected result 603 under the standard driving environment has been determined, a second lookup operation is performed in a selected command calibration table 314B corresponding to the current driving environment to locate a matching entry based on the current state (e.g., speed, steering angle) of the vehicle and the expected vehicle state (e.g., expected acceleration, expected steering angle). A second control command can be obtained from the matching entry. The second control command is then issued to the vehicle. For example, referring to FIG. 5B, based on the current state of the vehicle and the expected state of the vehicle, a lookup operation is performed to locate an entry having field 552 and field 553 relatively matching the current state and expected state of the vehicle, respectively. Once a matching entry has been identified, a control command can be obtained from field 551 of the matching entry. The obtained control command can be utilized to control the vehicle, without having to calculate the same at real-time which may be time and resource consuming.

As a result, the user driver would have the same experience or expectation under the circumstances as of under the ideal driving environment. For example, if 10% throttle under the standard driving environment will provide 0.5 m/s² acceleration, it may require 25% throttle to achieve the same acceleration when fully loaded. If the vehicle at the point in time is fully loaded. Based on a command calibration table corresponding to the full load, the system may determine that 25% throttle is needed based on the lookup operation of the corresponding command calibration table. The system will automatically apply 25% throttle to the vehicle, such that the driver will receive the same feedback or expectation and have the same driving experience as in the standard driving environment.

Note that the process of selecting a command calibration table and the process of determining control commands using the selected command calibration table may be performed by different execution or processing threads.

Figure 7:
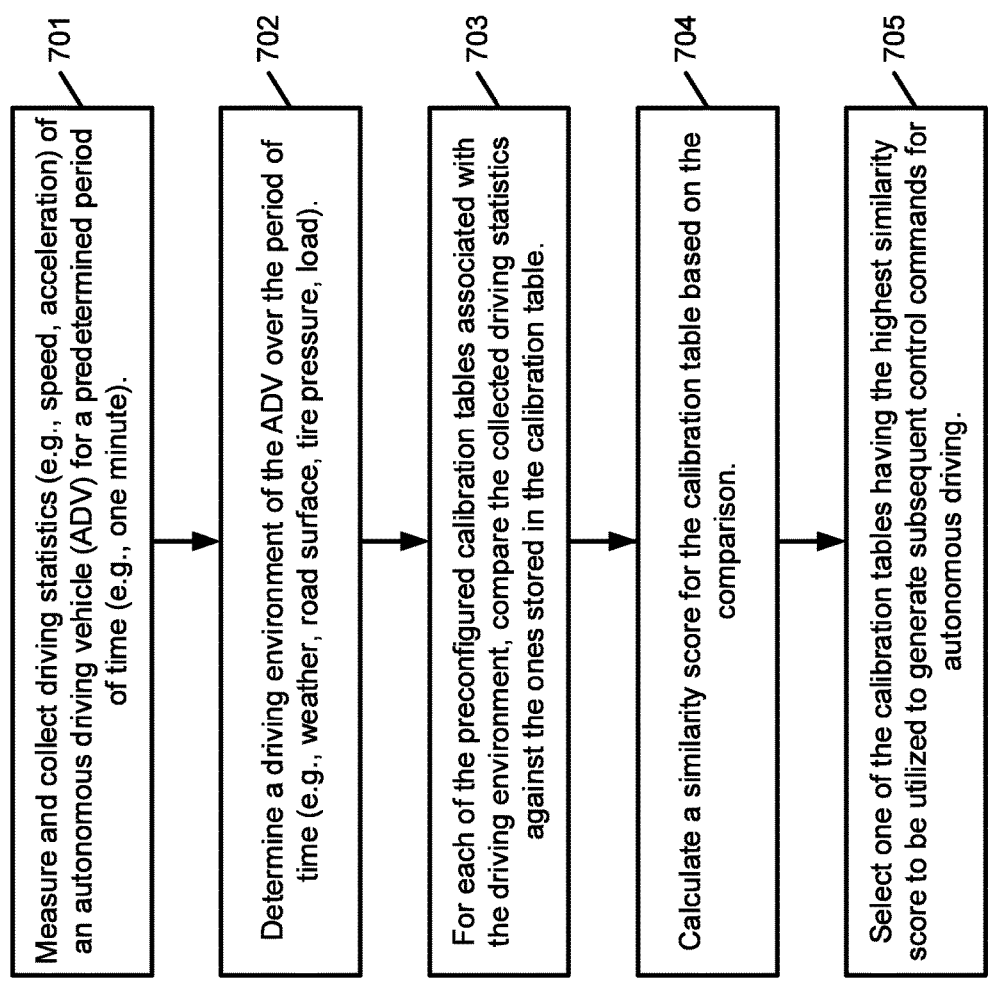
FIG. 7 is a flow diagram illustrating a process of selecting a calibration table according to one embodiment.

FIG. 7 is a flow diagram illustrating a process of determining and selecting a command calibration table based on a current driving environment according to one embodiment. Process 700 may be performed by processing logic which may include software, hardware, or a combination thereof. For example, process 700 may be performed by command calibration module 308. Referring to FIG. 7, in operation 701, processing logic measures and collects driving statistics (e.g., speed, acceleration) of an ADV for a predetermined period of time (e.g., one minute). In operation 702, processing logic optionally determines a driving environment associated with the ADV at the point in time (e.g., weather condition, road surface condition, etc.).

In operation 703, for each of the command calibration tables that have been preconfigured (optionally associated with the driving environment determined at the point in time), processing logic compares the driving statistics measured at the time and the corresponding driving statistics stored in the command calibration table. In operation 704, processing logic calculates a similarity score for the command calibration table based on the comparison between the dynamically measured data and the previously stored data. The similarity score represents the similarity between the data collected at the point in time and the data previously collected and stored in the table.

In one embodiment, the dynamically collected data may be collected over a period of time such as recording a subset of data every 100 ms for one minute. For each of the subsets of data, a difference between the subset of data is compared to each corresponding subset of data stored in the command calibration table. An averaged difference is calculated based on all the differences of the subsets of data, which is utilized to determine a similarity score for that particular command calibration table. For example, for a given speed and a given throttle command issue of a subset, the actual acceleration of the vehicle is compared with a recorded acceleration of an entry of the calibration table that relatively matches the speed and throttle command. A difference between the actual acceleration and the previously recorded acceleration is calculated.

In operation 705, processing logic selects one of the command calibration tables having the highest similarity score, which will be utilized to determine the control commands subsequently during the autonomous driving. Process 700 may be periodically performed to determine whether a different command calibration table should be selected due to the changes of driving environment.

Figure 8:
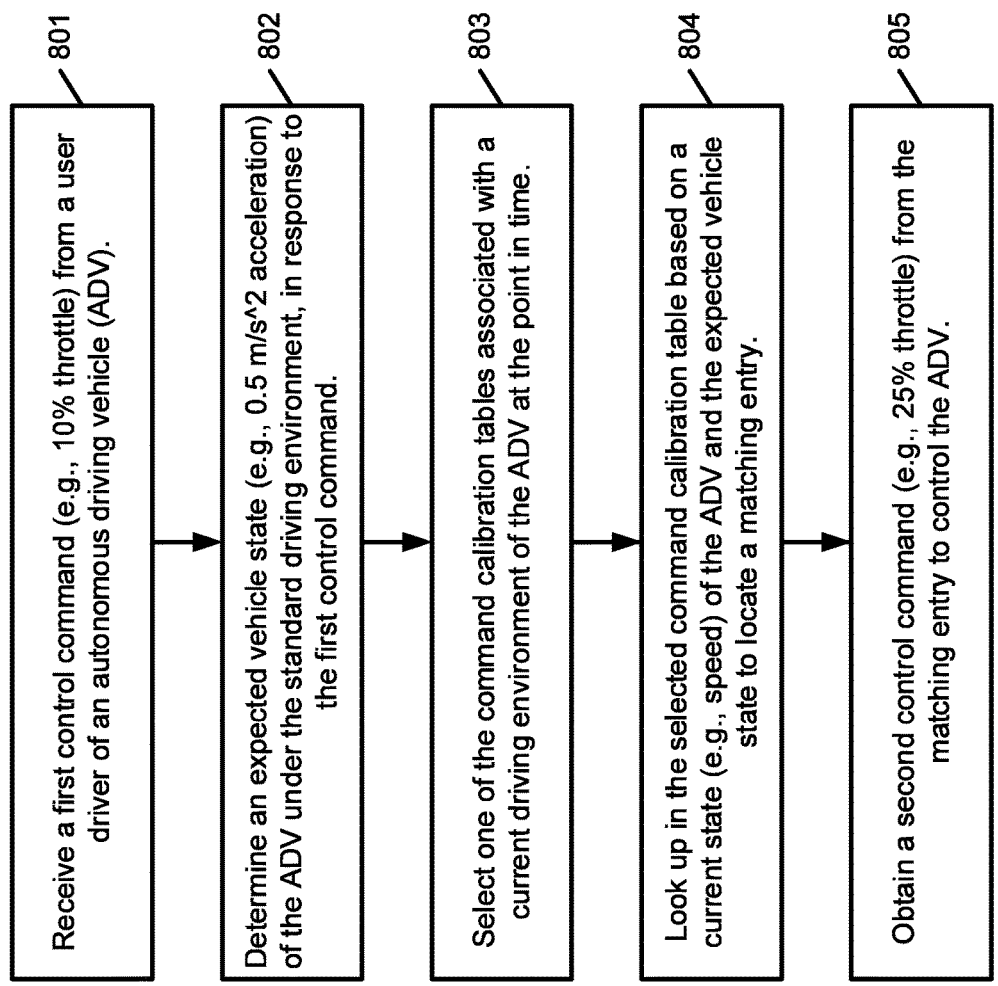
FIG. 8 is a flow diagram illustrating a process of determining a control command using a command calibration table according to one embodiment.

FIG. 8 is a flow diagram illustrating a process of determining control commands for operating an autonomous driving vehicle according to one embodiment. Process 800 may be performed by processing logic which may include software, hardware, or a combination thereof. For example, process 800 may be performed by command calibration module 308. Referring to FIG. 8, in operation 801, processing logic receives a first control command (e.g., 10% throttle). The first control command may be received from planning module 305 and initiated from a human driver. In response to the first control command, in operation 802, an expected vehicle state or vehicle response (e.g., 0.5 m/s²), is determined based on the control command and a current state (e.g., current speed) of the vehicle under the standard or ideal driving environment. In one embodiment, processing logic performs a first lookup operation in a standard command calibration table based on the current vehicle state and the first control command to obtain the expected vehicle state. In operation 803, one of the command calibration tables corresponding to a current driving environment is selected. In operation 804, processing logic performs a second lookup operation based on the current vehicle state and the expected vehicle state to locate a matching entry, and in operation 805, processing logic obtains a second control command (e.g., 25% throttle) from the matching entry. The second control command is then utilized to control the vehicle.

Figure 9:
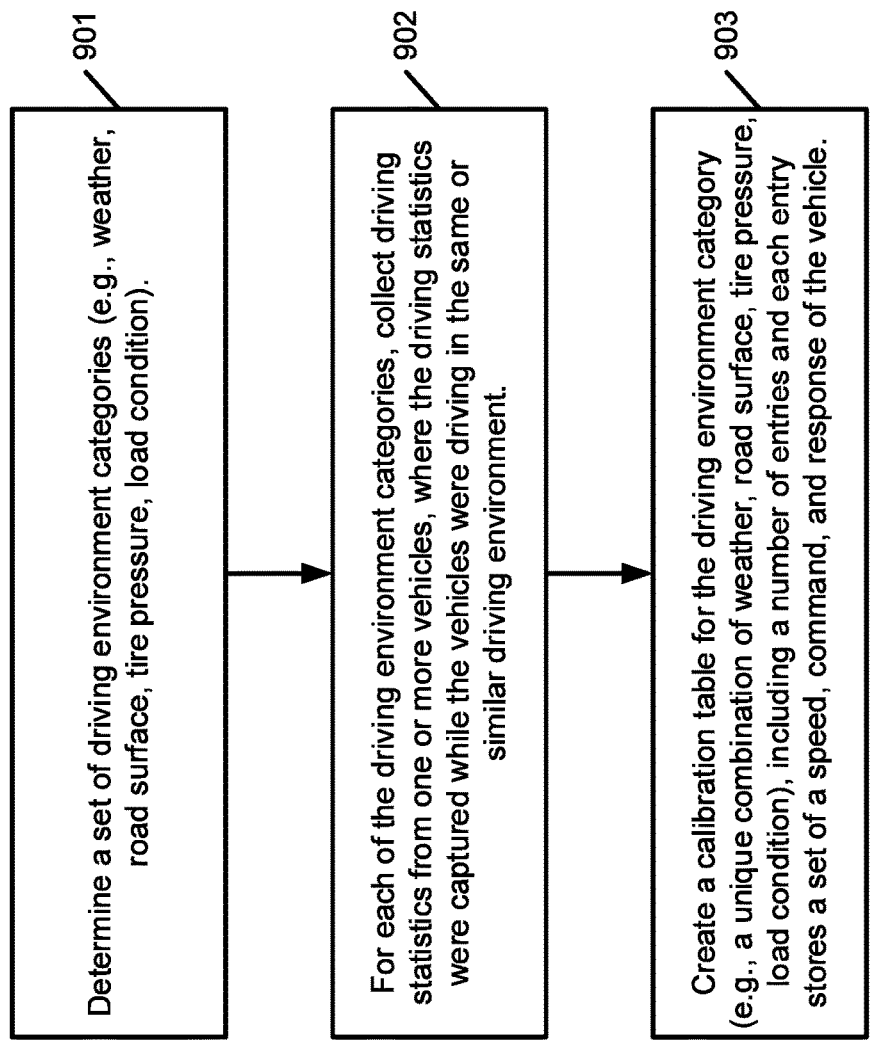
FIG. 9 is a flow diagram illustrating a process of creating a calibration table according to one embodiment.

FIG. 9 is a flow diagram illustrating a process of creating calibration tables according to one embodiment. Process 900 may be performed by processing logic which may include software, hardware, or a combination thereof. Process 900 may be performed by calibration table generator 125 of FIG. 1. Referring to FIG. 9, processing logic defines a number of driving environment categories (e.g., weather condition, road surface condition, tire pressure, load condition). For each of the driving environment categories, in operation 902, driving statistics of one or more vehicles are collected, which may be captured while the vehicles were driving in the same or similar driving environment. In operation 903, a calibration table is created for the driving environment category. The calibration table includes a number of entries. Each entry stores a set of a speed of a vehicle, a control command issued, and a response data (e.g., acceleration, steering angle) of the vehicle in response to the control command issued. The calibration tables can be utilized to determine control commands at real-time during autonomous driving of vehicles.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 10:
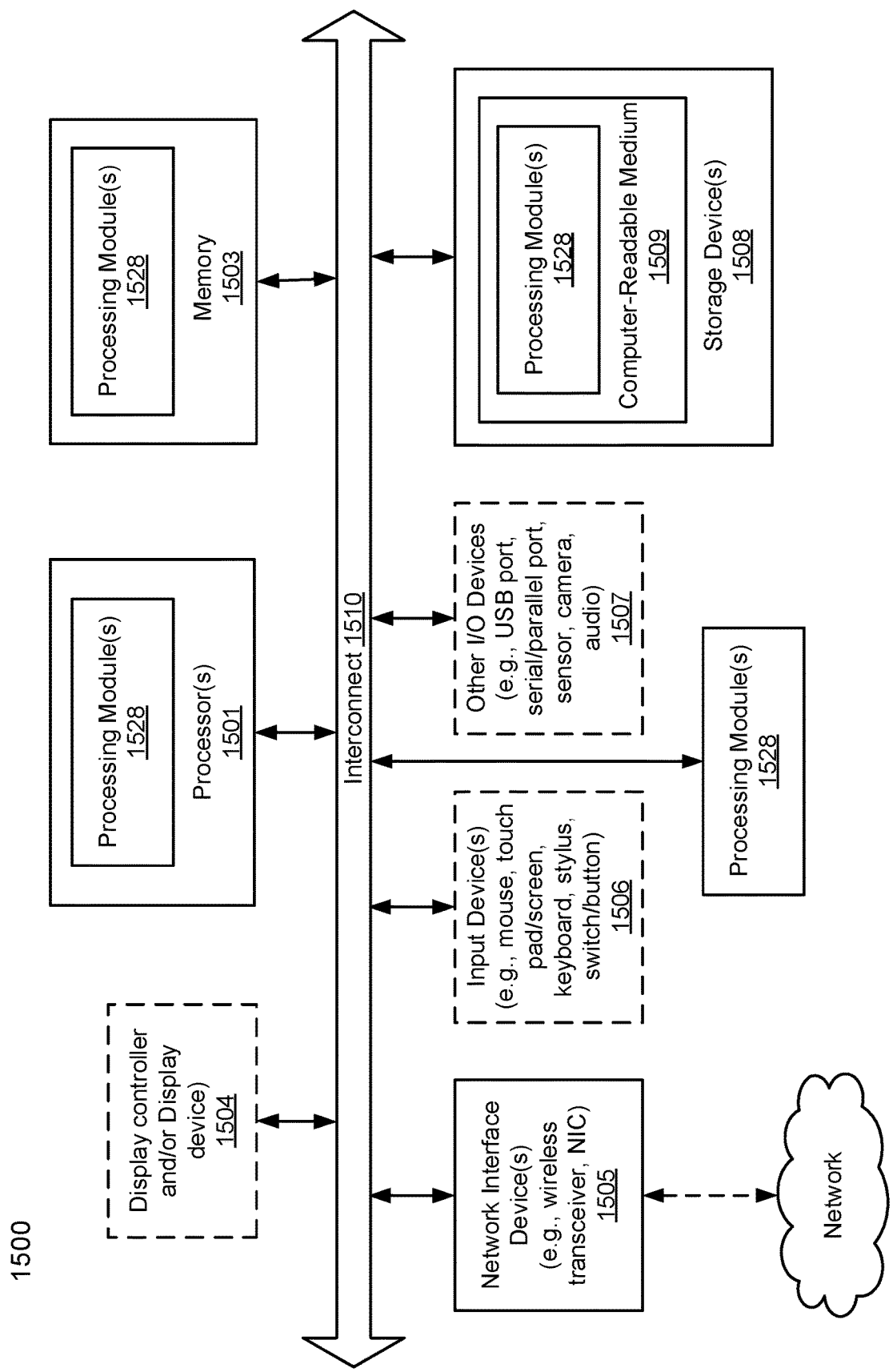
FIG. 10 is a block diagram illustrating a data processing system according to one embodiment.

FIG. 10 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, or calibration table generator 125. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method to operate an autonomous driving vehicle, the method comprising:
   receiving a first control command to control an autonomous driving vehicle (ADV);
   determining an expected acceleration of the ADV in response to the first control command in view of a current speed of the ADV under a standard driving environment;
   selecting one of a plurality of command calibration tables based on a current driving environment associated with the ADV;
   performing a lookup operation in the selected command calibration table to obtain a second control command based on the current speed and expected acceleration of the ADV; and
   issuing the second control command to control the ADV.

2. The method of claim 1, wherein each of the command calibration tables includes a plurality of entries, wherein each entry maps a command issued, a speed at a time of issuing the command, and an acceleration in response to the command issued in a particular driving environment.

3. The method of claim 1, wherein each driving environment includes at least one of a weather condition, a road surface condition, or a load condition.

4. The method of claim 3, wherein the weather condition indicates whether a road on which the ADV is driving is wet or dry, and wherein the road surface condition indicates whether a road surface of the road is flat, rough, or hybrid.

5. The method of claim 3, wherein the load condition is measured by tire pressure in high, medium, or low.

6. The method of claim 1, wherein each of the command calibration tables was created by driving a vehicle in an identical or similar driving environment and measuring and collecting driving statistics at different points in time during driving.

7. The method of claim 1, wherein determining an expected acceleration of the ADV comprises:
 performing a second lookup operation in a standard command calibration table based on the current speed of the vehicle and the first control command to locate a matching entry; and
 obtaining the expected acceleration from the matching entry, wherein the standard command calibration table was created based on driving statistics under the standard driving environment.

8. The method of claim 1, wherein selecting one of a plurality of command calibration tables based on the driving environment comprises:
 collecting a first set of driving statistics data for a predetermined period of time while the ADV is driving in the current driving environment;
 identifying a set of command calibration table candidates from the plurality of command calibration tables that are associated with the current driving environment;
 comparing the first set of driving statistics data against a second set of driving statistics data obtained from each of the command calibration table candidates;
 calculating a similarity score for each of the command calibration table candidates based on the comparison; and
 selecting one of the command calibration table candidates with a highest similarity score as the selected command calibration table.

9. The method of claim 8, wherein comparing the first set of driving statistics data against a second set of driving statistics data and calculating a similarity score comprise:
 for each subset of driving statistics data of the first set measured at a particular point in time,
  obtaining a first speed, a first control command issued, and a first response from a vehicle measured,
  performing a lookup operation in a command calibration candidate to locate an entry having a second speed and a second control command relatively matching the first speed and the first control command, and
  calculating a difference between the first response and a second response obtained from the matching entry; and
 calculating the similarity score for the command calibration table candidate based on an averaged difference between real-time measured responses and pre-recorded responses from the command calibration table candidate.

10. A non-transitory machine-readable medium having instructions stored therein, which when executed by a processor, cause the processor to perform operations, the operations comprising:
 receiving a first control command to control an autonomous driving vehicle (ADV);
 determining an expected acceleration of the ADV in response to the first control command in view of a current speed of the ADV under a standard driving environment;
 selecting one of a plurality of command calibration tables based on a current driving environment associated with the ADV;
 performing a lookup operation in the selected command calibration table to obtain a second control command based on the current speed and expected acceleration of the ADV; and
 issuing the second control command to control the ADV.

11. The machine-readable medium of claim 10, wherein each of the command calibration tables includes a plurality of entries, wherein each entry maps a command issued, a speed at a time of issuing the command, and an acceleration in response to the command issued in a particular driving environment.

12. The machine-readable medium of claim 10, wherein each driving environment includes at least one of a weather condition, a road surface condition, or a load condition.

13. The machine-readable medium of claim 12, wherein the weather condition indicates whether a road on which the ADV is driving is wet or dry, and wherein the road surface condition indicates whether a road surface of the road is flat, rough, or hybrid.

14. The machine-readable medium of claim 12, wherein the load condition is measured by tire pressure in high, medium, or low.

15. The machine-readable medium of claim 10, wherein each of the command calibration tables was created by driving a vehicle in an identical or similar driving environment and measuring and collecting driving statistics at different points in time during driving.

16. The machine-readable medium of claim 10, wherein determining an expected acceleration of the ADV comprises:
 performing a second lookup operation in a standard command calibration table based on the current speed of the vehicle and the first control command to locate a matching entry; and
 obtaining the expected acceleration from the matching entry, wherein the standard command calibration table was created based on driving statistics under the standard driving environment.

17. The machine-readable medium of claim 10, wherein selecting one of a plurality of command calibration tables based on the driving environment comprises:
 collecting a first set of driving statistics data for a predetermined period of time while the ADV is driving in the current driving environment;
 identifying a set of command calibration table candidates from the plurality of command calibration tables that are associated with the current driving environment;
 comparing the first set of driving statistics data against a second set of driving statistics data obtained from each of the command calibration table candidates;
 calculating a similarity score for each of the command calibration table candidates based on the comparison; and selecting one of the command calibration table candidates with a highest similarity score as the selected command calibration table.

18. The machine-readable medium of claim 17, wherein comparing the first set of driving statistics data against a second set of driving statistics data and calculating a similarity score comprise:
for each subset of driving statistics data of the first set measured at a particular point in time,
obtaining a first speed, a first control command issued, and a first response from a vehicle measured,
performing a lookup operation in a command calibration candidate to locate an entry having a second speed and a second control command relatively matching the first speed and the first control command, and
calculating a difference between the first response and a second response obtained from the matching entry; and
calculating the similarity score for the command calibration table candidate based on an averaged difference between real-time measured responses and pre-recorded responses from the command calibration table candidate.

19. A data processing system, comprising:
a processor; and
a memory coupled to the processor to store instructions, which when executed by the processor, cause the processor to perform operations, the operations including
receiving a first control command to control an autonomous driving vehicle (ADV),
determining an expected acceleration of the ADV in response to the first control command in view of a current speed of the ADV under a standard driving environment,
selecting one of a plurality of command calibration tables based on a current driving environment associated with the ADV,
performing a lookup operation in the selected command calibration table to obtain a second control command based on the current speed and expected acceleration of the ADV, and
issuing the second control command to control the ADV.

20. The system of claim 19, wherein each of the command calibration tables includes a plurality of entries, wherein each entry maps a command issued, a speed at a time of issuing the command, and an acceleration in response to the command issued in a particular driving environment.

* * * * *